(12) United States Patent
Wyss et al.

(10) Patent No.: US 11,897,642 B2
(45) Date of Patent: Feb. 13, 2024

(54) SECURITY VACUUM PACKAGING AND METHOD FOR CLOSING THE SECURITY VACUUM PACKAGING

(71) Applicant: TEPOTEC MAVINS SÀRL (GMBH, LLC), Windisch (CH)

(72) Inventors: Fabian Wyss, Zürich (CH); Jad Zeidan, Wollerau (CH); Douglas Bakkum, Adliswi (CH)

( * ) Notice: Subject to any disclaimer, the term of this patent is extended or adjusted under 35 U.S.C. 154(b) by 287 days.

(21) Appl. No.: 17/429,994

(22) PCT Filed: May 13, 2019

(86) PCT No.: PCT/EP2019/062245
§ 371 (c)(1),
(2) Date: Aug. 11, 2021

(87) PCT Pub. No.: WO2020/173579
PCT Pub. Date: Sep. 3, 2020

(65) Prior Publication Data
US 2022/0144466 A1     May 12, 2022

(30) Foreign Application Priority Data
Feb. 26, 2019   (CH) .................................... 00234/19

(51) Int. Cl.
*B65B 31/02*     (2006.01)
*B65B 31/04*     (2006.01)
(Continued)

(52) U.S. Cl.
CPC .............. *B65B 31/02* (2013.01); *B65B 31/04* (2013.01); *B65B 57/145* (2013.01); *B65D 81/2015* (2013.01)

(58) Field of Classification Search
CPC ....... B65B 31/02; B65B 31/04; B65B 57/145; B65D 81/2015; B65D 2101/00
(Continued)

(56) References Cited

U.S. PATENT DOCUMENTS

| | | | | |
|---|---|---|---|---|
| 4,098,577 A | * | 7/1978 | Halpern | ............... B65D 55/026 436/1 |
| 4,489,841 A | * | 12/1984 | Thompson | ........... B65D 55/026 215/230 |

(Continued)

FOREIGN PATENT DOCUMENTS

| | | |
|---|---|---|
| EP | 2363350 A1 | 9/2011 |
| GB | 2 517 774 A | 3/2015 |

(Continued)

OTHER PUBLICATIONS

International Search Report dated Sep. 19, 2019 in corresponding International Patent Application No. PCT/EP2019/062245, filed May 13, 2019 (with English Translation).

(Continued)

*Primary Examiner* — Dariush Seif
(74) *Attorney, Agent, or Firm* — GLOBAL IP COUNSELORS, LLP (57) ABSTRACT

A method for closing and securing a safety vacuum packaging in which an object to be secured and a plurality of particles are arranged in an interior space of a container of the safety vacuum packaging. Subsequently, the safety vacuum packaging is vacuumed via a vacuum seal, and the plurality of particles is fixed in a random immobile state. The safety vacuum packaging is closed, and the random immobile state of the particles is captured. The captured random immobile state of the particles is stored for later comparison.

20 Claims, 6 Drawing Sheets

(51) Int. Cl.
B65B 57/14 (2006.01)
B65D 81/20 (2006.01)

(58) Field of Classification Search
USPC .......................................................... 53/433
See application file for complete search history.

(56) References Cited

U.S. PATENT DOCUMENTS

| | | | | |
|---|---|---|---|---|
| 5,064,664 A | * | 11/1991 | Hustad | B65D 75/5855 426/106 |
| 5,103,979 A | * | 4/1992 | Hustad | B65D 33/34 206/459.1 |
| 7,233,682 B2 | * | 6/2007 | Levine | G06Q 10/08 382/101 |
| 9,053,364 B2 | * | 6/2015 | Mercolino | G07D 7/2033 |
| 9,594,993 B2 | | 3/2017 | Picard et al. | |
| 10,192,089 B1 | * | 1/2019 | Rapoport | G07D 7/205 |
| 2006/0057255 A1 | | 3/2006 | Teal et al. | |
| 2010/0177993 A1 | * | 7/2010 | Chen | B65D 33/2533 383/207 |
| 2012/0056131 A1 | * | 3/2012 | Nagel | C09K 11/7713 252/301.36 |
| 2012/0261277 A1 | * | 10/2012 | Barnhizer | B65D 81/2084 53/434 |
| 2014/0067114 A1 | * | 3/2014 | Apell | G06V 30/416 382/190 |
| 2015/0223580 A1 | * | 8/2015 | Kinney | B65B 55/20 53/445 |
| 2015/0241341 A1 | * | 8/2015 | Ikeda | G01N 21/84 378/57 |
| 2016/0072980 A1 | * | 3/2016 | Göktekin | H04N 1/32309 358/2.1 |
| 2016/0083127 A1 | * | 3/2016 | Tillstrom | B65B 5/028 53/410 |
| 2017/0015445 A1 | * | 1/2017 | Holmes | G07F 11/165 |
| 2017/0203899 A1 | * | 7/2017 | Nakajima | B65D 33/004 |
| 2017/0305607 A1 | * | 10/2017 | Levillain | G09F 3/0292 |
| 2018/0104939 A1 | * | 4/2018 | Shaver | B32B 27/08 |
| 2018/0224150 A1 | * | 8/2018 | Lewis | F25D 29/003 |
| 2018/0297778 A1 | * | 10/2018 | Widitora | B65F 1/002 |
| 2019/0021393 A1 | * | 1/2019 | Novak | G06F 3/044 |
| 2019/0360890 A1 | * | 11/2019 | Dodrill | B65D 75/5855 |
| 2019/0367239 A1 | * | 12/2019 | Camenisch | B65D 79/02 |
| 2020/0039719 A1 | * | 2/2020 | Wang | A61B 50/30 |
| 2020/0269432 A1 | * | 8/2020 | Beinhofer | B25J 19/023 |

FOREIGN PATENT DOCUMENTS

| | | |
|---|---|---|
| JP | H02242705 A | 9/1990 |
| JP | 2008512320 A | 4/2008 |
| JP | 2009096198 A | 5/2009 |
| JP | 2014520039 A1 | 8/2014 |
| WO | 2012/023862 A1 | 2/2012 |
| WO | 2015/126697 A2 | 8/2015 |
| WO | 2016/182831 A1 | 11/2016 |

OTHER PUBLICATIONS

Japanese Office Action dated Jan. 31, 2023 in corresponding Japanese Patent Application No. 2021-547316 (with English Translation).

* cited by examiner

SECURITY VACUUM PACKAGING AND METHOD FOR CLOSING THE SECURITY VACUUM PACKAGING

CROSS-REFERENCE TO RELATED APPLICATIONS

This application is a U.S. National Stage application of International Application No. PCT/EP2019/062245, filed May 13, 2019, which claims priority to Swiss Patent Application No. 00234/19, filed Feb. 26, 2019, the contents of which are hereby incorporated herein by reference.

BACKGROUND

Field of the Invention

The invention relates to a method for closing and securing safety vacuum packaging. The invention further relates to safety vacuum packaging for use in the method, and to a computer program product for verifying a random immobile state captured by the method.

Background Information

In the state of the art, a wide variety of vacuum packaging is known inter alia from the packaging industry. In this respect, vacuum packaging is usually a gas-tight packaging of a product in which interspaces and thus gases, in particular reactive gases within the product have been largely removed. In the food industry, the extraction of oxygen from the packaging is particularly important. The vacuum packaging has several advantages in the food industry. As with modified atmosphere packaging (under an inert gas such as nitrogen or argon), the products have a longer shelf life because no oxygen gets to the products, which can cause them to become unusable over time due to chemical reactions or biological processes. In addition, by using the vacuum packaging, the necessary volume is also reduced to a minimum. Composite films comprising polyamide or polyethylene are preferably used as a gas-tight packaging material.

In the case of vacuum packagings, the air (or an ambient gas) is largely removed from an interior of the vacuum packaging via a vacuum packaging opening, and then the vacuum packaging opening is closed in a gas-tight manner.

In addition to the requirements of the food industry to protect their products from oxidation, there is also, inter alia, a great need for safety packagings, which protect a customer from a product being opened during shipping and replaced, for example, by a counterfeit.

In addition to seal closures and bar codes for safety packagings, safety packagings for cash transport are also known, which color a content with a liquid and make it unusable in case of unauthorized opening.

In this context with bar codes, U.S. Pat. No. 9,594,993B2 describes so-called 2D bar codes. Here, information is stored in the patterns of the 2D barcode.

In addition, safety packagings are known in the state of the art, for example in the form of bottles, whose safety device is irreversibly destroyed when opened.

In this context, EP2363350A1 describes a container with a closure system for tamper-proof storage, in particular for doping test samples, with a screwed closure cap which is non-detachably connected to the container body in a non-destructive manner both before initial use and after filling in the closure position. A locking means is anchored to the container and is destroyed during initial opening via a predetermined separation area.

SUMMARY

It has been determined that the methods and devices known in the state of the art are relatively insecure in terms of a combination of authenticity and first-opening guarantee. Most safety packagings can be copied and replaced with a duplicate after the initial opening with relatively little effort and cost. However, there is an increasing need for safer packagings.

It is therefore an object of the invention to provide a safety packaging and a method for securing a safety packaging, which avoid the adverse effects known from the state of the art.

The object is met by a method according to the invention for closing and securing a safety vacuum packaging, a safety vacuum packaging for use in the method according to the invention, and a computer program product for verifying a random immobile state captured by the method according to the invention.

According to the invention, a method for closing and securing a safety vacuum packaging is proposed, comprising the following steps. A safety vacuum packaging is provided. An object to be secured is arranged in an interior space of a container of the safety vacuum packaging. In addition, a plurality of particles is arranged in the interior space of the container. The safety vacuum packaging, in particular the interior space of the container, is vacuumed via a vacuum seal, whereby the plurality of particles is fixed in a random immobile state. The safety vacuum packaging is closed, in particular via the vacuum seal. The random immobile state of the particles is captured and stored (for later comparison).

The plurality of particles is fixed inside the container by the vacuum since the plurality of particles is virtually clamped in the random immobile state by the vacuum and a deformation of the container. If the safety vacuum packaging is opened, air can get into the interior space of the container and the plurality of particles can move freely again, so that the previous random immobile state cannot be restored (or almost not, depending on the number of particles). Due to a random arrangement of the particles in the container, therefore, a kind of unique fingerprint is created, which ensures the safety. The higher an entropy of the particles (due to higher number and other factors mentioned later), the safer is also the safety vacuum packaging.

In an embodiment of the invention, the object to be secured and the plurality of particles are preferably first arranged in the interior space of the container, then the interior space of the container is vacuumed, and then the safety vacuum pack is closed. The random immobile state of the particles is captured and stored after the plurality of particles has been fixed in a random immobile state. The plurality of particles is fixed in the random immobile state via vacuuming.

The object to be secured and the safety vacuum packaging were secured via the method steps described above. In order to check this (i.e., perform a check on the random immobile state of the particles), the random immobile state of the particles must be re-captured. This re-capture is usually performed after the safety vacuum packaging has been shipped.

Here, a distinction is made between a stored random immobile state of the particles, which as described above corresponds to the captured random immobile state of the particles after it has been stored, and a re-captured random immobile state of the particles, which has been re-captured after the stored random immobile state of the particles, preferably after shipping, and is intended to be compared with the stored random immobile state.

Thus, to check the random immobile state of the particles, a comparison and verification of the re-captured random immobile state of the particles with the previously stored random immobile state of the particles is performed. Preferably, the random immobile state of the particles is stored in a database as the stored random immobile state of the particles and can be retrieved there for comparison and verification.

If no intervening change (packaging defect/opening) has been made to the secured safety vacuum packaging, the re-captured random immobile state of the particles should mostly match the previously stored random immobile state of the particles. Thus, if there is no intervening change to the secured safety vacuum packaging, the random immobile state of the particles should be largely unchanged.

Within the framework of the present invention, the term "closing of the vacuum packaging" can be understood to mean the closing and sealing of the safety vacuum packaging and, in particular, also the closing of a vacuumed area of the safety vacuum packaging. Here, the vacuum seal can correspond to an opening through which the plurality of particles and the object to be secured are fed into the interior space of the container. However, the vacuum seal and the opening can also be separate parts of the safety vacuum packaging. For example, a well-known vacuum seal is a weld seam on a polymer bag (as a container/safety vacuum packaging).

Within the framework of the present invention, the term "plurality of particles" can be understood to mean 10 to 10000 particles, in particular 10 to 5000 particles, especially 50 to 1500 particles. In the case of smaller safety vacuum packaging, smaller particle quantities can also be used such as 10 to 500 particles, in particular 10 to 150 particles. Of course, any other appropriate number of particles is possible.

According to embodiments of the invention, the safety vacuum packaging is further proposed for use in a method. Here, the safety vacuum packaging comprises, as described above, the container having the interior space for receiving the object to be secured, the plurality of particles arranged in the interior space of the container, and the vacuum seal for vacuuming and sealing the interior space of the container. In this embodiment, the plurality of particles is a plurality of unconnected, i.e., non-contiguous, particles.

In addition, the safety vacuum container can comprise a particle container arranged in the interior space of the container for receiving the plurality of particles. Here, the plurality of particles should be arranged at least partially, preferably completely, in the particle container. The plurality of particles can thus be arranged partially or completely in the particle container, which is then arranged in the interior space of the container. A contact of the particles with the object to be secured can be avoided via the particle container.

Due to the plurality of particles in the safety vacuum packaging, an entropy and thus safety is controlled (the more particles, the higher the entropy). An optimum theoretical entropy corresponds to 30 to 50% of the area of the particle container, in particular 50% of the area of the particle container which is filled with particles. For example, in the case of a rectangular container with dimensions 100 mm by 100 mm and an area of 10000 mm$^2$, an optimum plurality of particles is approximately 5000 particles with a single particle volume of approximately 1 mm$^3$.

In an embodiment of the invention, the safety vacuum packaging can comprise the particle container having a first attachment device and the object to be secured having a surface, wherein the particle container is attached to the surface of the object to be secured by the first attachment device. Here, the first attachment device can be a kind of adhesive device with which the particle container is glued (preferably reversibly) to the surface of the object to be secured. In addition, the first attachment device can be a shell in which the object to be secured is arranged and via which the particle container is connected to the object to be secured.

The particle container can also comprise a second attachment device by which the particulate container is attached to the container in the interior space. In this embodiment, the second attachment device can be a kind of inner pocket in the interior space of the container.

In a further important embodiment, the particle container can be an air-permeable particle container, i.e., it can form an open system (can exchange both energy and matter (gases in this case) with its environment) with the interior space of the container. In this way, when the method according to embodiments of the invention is carried out, the interior space of the container and the particle container are simultaneously vacuumed during vacuuming of the safety vacuum packaging.

In a particularly advantageous embodiment of the invention, the particles are microparticles, in particular microparticles with a diameter (i.e., a size) between 0.01 mm and 5 mm, especially between 0.1 mm and 3 mm. Here, the term diameter means an average particle diameter. Of course, the plurality of particles can comprise particles or multiple particles of different (average) sizes. Thus, a first subset of the plurality can have a first size and a second subset of the particles can have a second size. For example, the first size could be 0.5 mm and the second size could be 1 mm. Different sizes of particles can further improve the safety of the safety vacuum packaging.

The particle diameter in this range can generally be measured with a measurement device by laser diffraction particle size analysis. In a particle size measurement device of the laser diffraction type, the size of a powder or of the particles as a collective unit is generally represented as a distribution of the frequency ratio for each size (particle diameter) of a large number of measurement results, which is designated as a particle size distribution.

It is also possible that the container or the safety vacuum packaging has at least a transparent container part, in particular a transparent container side. In this context, it is also additionally possible that the particle container has at least a transparent particle container part, in particular a transparent particle container side. Of course, the container can also be completely transparent.

The particle container can also have the transparent and a light or dark particle container part, in particular particle container side. A light, such as a white particle container part, in particular particle container side, has the advantage that unwanted light reflections from the transparent container (container part, or particle container) can be reduced. For example, a dark particle container part, in particular particle container side, can be black or even dark blue. In principle, an inversion effect between the plurality of particles and the particle container part, in particular particle container side, should preferably be present, so that there are either dark particles on a light background or light particles on a dark background. Thus, a contrast between the background and the particles is created, which improves the capture of the random immobile state of the particles.

In a method according to the invention, in fact, the random immobile state of the particles can be captured by an optical method or by a spectroscopic method. In an optical method, the safety vacuum packaging is illuminated with light or light-like electromagnetic radiation. A part of this radiation is diffracted or reflected at a certain angle. In a spectroscopic method, the safety vacuum packaging interacts with electromagnetic radiation (absorption and emission). Here, different wavelengths (X-ray, UV, Vis, and IR) can be used. However, electromagnetic radiation of any wavelength or wavelength range is preferably converted into an image.

In practice, a camera is preferably used to capture the random immobile state of the particles by generating an optical image, i.e., the image of the safety vacuum packaging. Of course, the camera works preferably in the visible range of light. Particularly preferably, the random immobile state of the particles is captured photographically (for example, with a smartphone) as a unique random fingerprint and is stored in a secure database.

For example, an X-ray image of the safety vacuum packaging can also be generated, which represents the attenuation of X-rays by the safety vacuum packaging (and its components) due to different transmission properties. According to the method according to the invention, the random immobile state of the particles could be captured via the X-ray image.

If the object to be secured comprises a printed circuit board, the printed circuit board (with sealed plastic housings such as USB hardware) can additionally be verified by the X-ray image. Here, additional microchips of the printed circuit board can be detectable and the random solder bubbles on the printed circuit board can additionally be captured with the random immobile state of the particles and used for later comparing, since a positioning of the printed circuit board and thus the solder bubbles in the safety vacuum packaging is also random and the position of the printed circuit board in the container is fixed by the vacuum.

For the generation of the image described above, it is of course advantageous if the safety vacuum packaging has the transparent container part (transparent to visible light) and the transparent particle container part, respectively, as the generation of the image for capturing the random immobile state of the particles is simplified. For this purpose, the particle container can, for example, include a thin rigid material, in particular glass, acrylic glass or polycarbonate. Of course, a radiation-transmissive container part or particle container part can also be present, so that the generation of an image for wavelength ranges other than the visible range is possible (e.g., container part which is largely transmissive to X-rays).

The container and/or the particle container preferably includes a rigid transparent and/or black and/or white plastic film. For this purpose, inter alia, polyamide or polyvinylchloride (PVC) or specially anti-adhesive coated composite films, in particular with nano-coatings, to which the plurality of particles do not adhere even after a long period of time are suitable. In a particularly preferred embodiment, the container and/or the particle container can include at least partially of a transparent thin (approximately 6-15 µm)/or soft polymer (e.g., 60 Shore D or less) to also fix the smaller particles. In addition, the container and/or the particle container can also include partially of a solid/hard polymer (e.g., more than 60 Shore D) so that the particles are fixed under vacuum between the hard and soft polymer.

The plurality of particles can have different shapes. Here, the particles can be spherical particles. Of course, it is possible that the particles are cube-shaped, cuboidal, cone-shaped, cylindrical, pyramid-shaped, or have any other suitable shape. The plurality of particles can also have several different particles that differ in shape. Thus, a first plurality of particles can be spherical, while a second plurality of particles is cuboidal. For further differentiation, the particles can have different colors or materials, such that a third plurality of particles is red, and a fourth plurality of particles is blue. Here, suitable materials for the particles are white plastic and/or rubber and/or sugar and/or glass and/or ceramic and/or polystyrene. These materials can be colored or shaped accordingly, depending on the embodiment. Different shapes, colors and materials of particles can further improve the entropy and thus the safety of the safety vacuum packaging. An advantage of an elastic particle material such as rubber or a solid particle material such as sugar, glass or ceramics is that they are not irreversibly deformed by the vacuum.

The particles (i.e., the plurality of particles) can also be provided with a special coating so that the particles (even after a long time) in the random immobile state, move loosely when the vacuum is dissolved (and as a consequence, the random immobile state of the plurality of particles is destroyed) and do not adhere to one side of the particle container or the safety vacuum packaging. For this purpose, the particles can be provided with a Teflon or nano coating, for example.

Furthermore, embodiments of the invention comprise a computer program product for verifying a random immobile state of the particles captured by a method according to the invention, by comparing the re-captured random immobile state of the particles with the stored random immobile state of the particles in a safety vacuum packaging.

For this purpose, the computer program product can be designed as an application for a smartphone. After the safety vacuum packaging is vacuumed, the random immobile state of the particles is captured, for example, via the smartphone camera in the application and preferably stored on a linked database via the application. To compare and verify the random immobile state of the particles of the safety vacuum packaging, the random immobile state of the particles in the safety vacuum packaging is re-captured via the application of the smartphone, and this re-captured random immobile state of the particles is compared with the stored random immobile state of the particles retrievable via the application. After comparison and verification, the application makes a statement whether the random immobile state of the particles has changed, i.e., whether the safety vacuum packaging has been opened and/or has been manipulated.

In this way, a consumer can discover whether his shipment has been manipulated via the random immobile state of the particles. The safety vacuum packaging according to the invention also offers protection for objects to be secured, such as codes to be protected from view, for example passwords or cryptographic keys.

The checking of the random immobile state of the particles can be carried out on the basis of a particle parameter, preferably on the basis of different particle parameters. As a particle parameter, inter alia, the size of the particles or the different sizes of different subsets of the particles can be used. In addition, the color and shape of the materials can be used for checking, as well as the relative distances of the particles to each other and the positions in the containers/particle container. The number of particles or the different numbers of subsets can also be checked. For example, if the first and second unequal subsets are present and the first subset comprises a number of 50 particles when the random immobile state of the particles is captured and the second subset comprises a number of 55 particles when the random immobile state of the particles is captured, these numbers can be checked when the random immobile state of the particles is re-captured.

These particle parameters, which are only a part of an inexhaustible list, are preferably captured in the image (whether photographically/light image, X-ray image or another suitable image representation) as described above.

An image recognition algorithm such as can be used for the computer program product according to embodiments of the invention preferably has the ability to interpret a digital image.

The computer program product functions in a particularly preferred manner similar to a human brain. A camera, in a possible analogy the eye, captures a three-dimensional environment as a two-dimensional image. The brain, the image recognition algorithm, interprets the recorded information. In order to optimally capture a random pattern including individual particles in a transparent vacuum bag, various filters and, if necessary, neural networks or other "machine learning algorithms" (also "deep learning") are applied, in which the computer program product learns to interpret correctly in marginal cases and therefore constantly improves the verification.

As a rule, the image to be processed (preferably a color image) is converted into a binary image in a first step by thresholding, and in subsequent steps it is optimally processed into the information to be interpreted by algorithms. Cases of doubt/disturbances of the interpretation arise inter alia due to changing light conditions, reflections of light for example on the transparent vacuum bag, or if the object to be captured is on a similar background that differs only slightly from the object area to be captured, or an incorrect focus, or poor contrast, or also if a shooting angle of two (or more) conditions to be compared differ greatly. Furthermore, the algorithm must be able to compare an orientation of the two images to be compared. The algorithm must also be able to compensate for different shooting angles in order to be able to reliably compare two random immobile states shot in different situations. If a computer program product has these capabilities, the computer program product can output various comparison parameters. Inter alia, it is possible to specify in percent how many random immobile states were captured as identical. A value can also be specified as to how confident the computer program product is in its own parameter specification, respectively how high the quality of the two raw images to be compared is, which can include inter alia lighting conditions, camera perspective, orientation, background, image sharpness and image resolution.

BRIEF DESCRIPTION OF DRAWINGS

The invention will be explained in more detail hereinafter with reference to the drawings.

DETAILED DESCRIPTION

Figure 1:
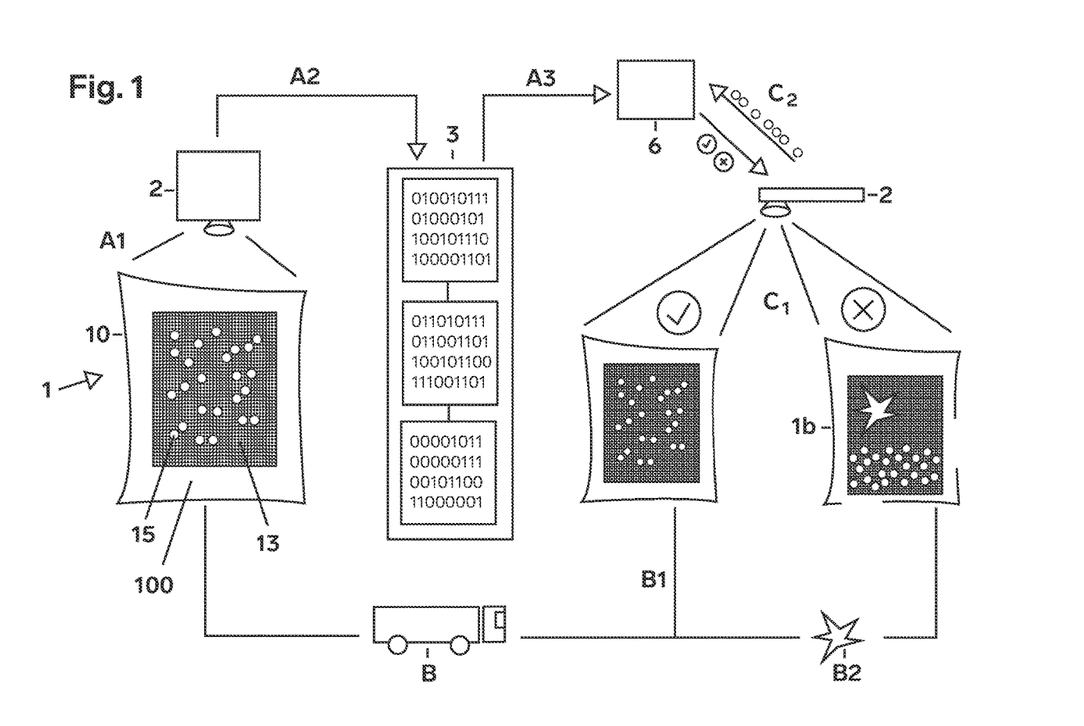
FIG. 1 is a schematic representation of a method according to an embodiment of the invention.

FIG. 1 shows a schematic representation of a method according to the invention. Here, a safety vacuum packaging 1 with a plurality of particles is shown. The safety vacuum packaging 1 is closed. For this purpose, an object 13 to be secured is arranged in an interior space 100 of a container 10 of the safety vacuum packaging 1. In addition, the plurality of particles 15 is arranged in the interior space 100 of the container 10. Then, the safety vacuum packaging 1 is vacuumed via a vacuum seal, whereby the plurality of particles 15 is fixed in a random immobile state. The safety vacuum packaging 1 is closed.

In step A1 shown, the random immobile state of the particles 15 is now captured by an image capturing device 2 (preferably a camera and capturing an optical image). In step A2, a captured random immobile state of the particles is encrypted by an application 3 and stored in a database 6 (preferably secure database, such as blockchain) in step A3.

In step B, the safety vacuum packaging 1 is shipped (for example, to a customer). In this situation, the safety vacuum packaging 1 can arrive intact (B1), or not intact/manipulated (B2). In step C1, the random immobile state of the particles is re-captured by the image capturing device 2. A re-captured random immobile state of the particles is compared in step C2 with a stored random immobile state of the particles from the database. Here, it is recognized that the random immobile state of the particles re-captured at the intact safety vacuum packaging 1 coincides with the stored random immobile state of the particles. In the case of the manipulated safety vacuum packaging 1b, it is recognized that the re-captured random immobile state of the particles does not coincide with the stored random immobile state of the particles.

Figure 2:
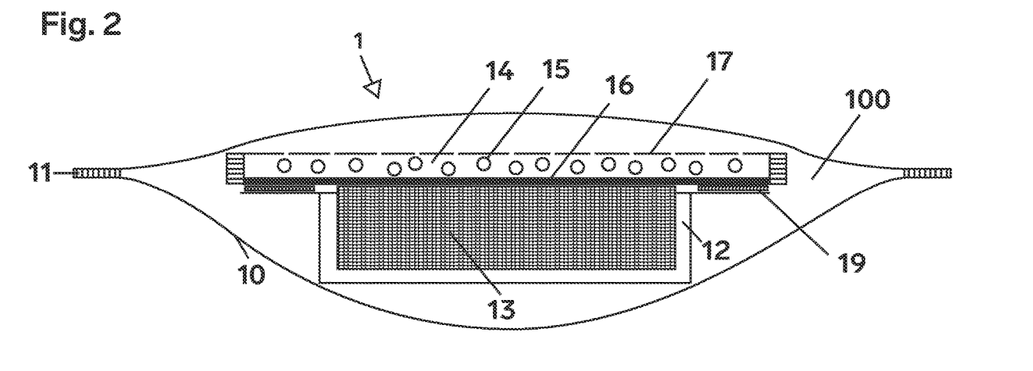
FIG. 2 is a schematic representation of a safety vacuum packaging according to an embodiment of the invention in a cross-section.

FIG. 2 shows a schematic representation of a safety vacuum packaging 1 according to an embodiment of the invention. The safety vacuum packaging 1 for use in a method according to the invention comprises the container 10 having the interior space 100 for receiving an object 13 to be secured. The plurality of unconnected particles 15 is arranged in the interior space 100 of the container. A vacuum seal 11 for vacuuming and sealing the interior space 100 of the container 10 of the safety vacuum packaging 1 is designed as a thermal weld seam. The safety vacuum packaging 1 is preferably a transparent vacuum bag.

In addition, the safety vacuum packaging comprises a particle container 14 arranged in the interior space 100 of the container 10 for receiving the plurality of particles 15, wherein the plurality of particles 15 is at least partially arranged in the particle container 14.

The object 13 to be secured has a surface on which the particle container 15 is arranged. The particle container 15 has a first attachment device 12 in the form of a rigid shell (open artificial shell), which is arranged around the object 13 to be secured and by which the particle container 14 is attached to the surface of the object 13 to be secured.

In addition, a black film 16 (preferably a black polyurethane film) is applied to the lower side of the particle container 14 to achieve an optimum contrast between the particles 15 and a background, when capturing the random immobile state of the particles (and when re-capturing them). Such an embodiment is particularly advantageous if the capturing of the random immobile state of the particles is done via a camera (in the visible range). An even better result can be achieved, for example, with white particles (e.g., from polystyrene).

In order to fix the plurality of particles in the random immobile state of the particles, a film 17 is arranged on the particle container 14 above the particles 15 (preferably a transparent polyurethane film), which fixes the particles 15 under vacuum.

Figure 3:
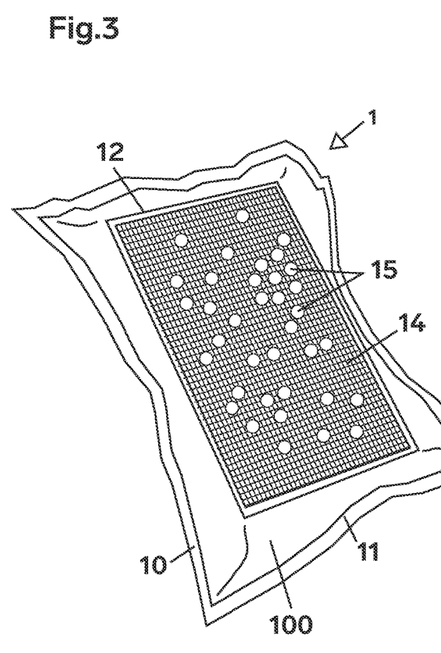
FIG. 3 is a schematic representation of a safety vacuum packaging according to an embodiment of to the invention in plan view.
Figure 4:
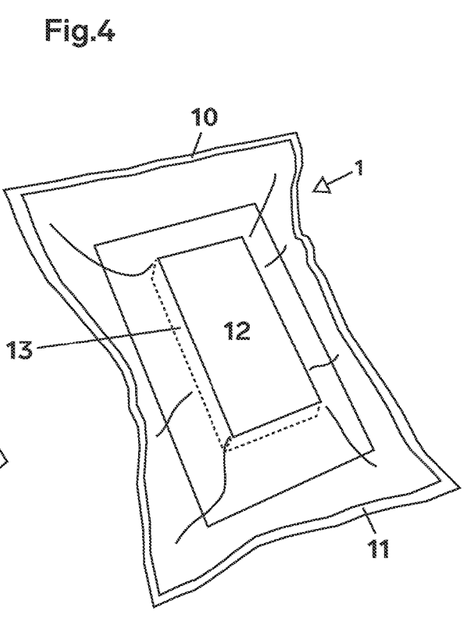
FIG. 4 is a schematic representation of a safety vacuum packaging an according to embodiment of the invention in the rear view.

FIG. 3 shows a schematic representation of a safety vacuum packaging 1 according to an embodiment of the invention in a plan view and FIG. 4 a schematic representation of a safety vacuum packaging 1 according to the invention in the rear view. Here, the safety vacuum packaging 1 comprises a particle container 14, which with the attachment device 12 in the form of a rigid shell (open artificial shell), which is arranged around the object 13 to be secured, or in which the object 13 to be secured is arranged, in order to arrange the particle container 15 on the object 13 to be secured.

The safety vacuum packaging 1 is preferably designed as a vacuum bag, and the opening 11 through which the particle container 14 with the plurality of particles 15 and the object 13 to be secured are arranged in the interior 100 of the container 10. The opening 11 is already closed, preferably via a weld seam (high frequency, ultrasonic or thermal).

Figure 5:
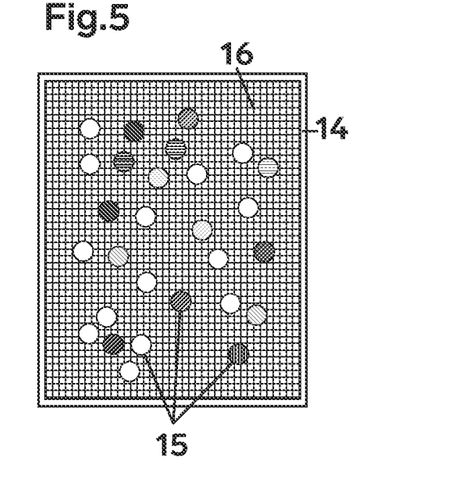
FIG. 5 is a schematic representation of a particle container according to an embodiment of the invention.

FIG. 5 shows a schematic representation of a particle container 14 according to an embodiment of the invention with the plurality of particles 15, wherein the plurality of particles 15 are colored differently to increase an entropy and thus a safety of the safety vacuum packaging in this way. For a better contrast, a colored film 16 is attached to a bottom of the particle container 14.

Here, it can be seen that the particle container 14 is designed as a separate part which can be inserted into the safety vacuum packaging.

Figure 6:
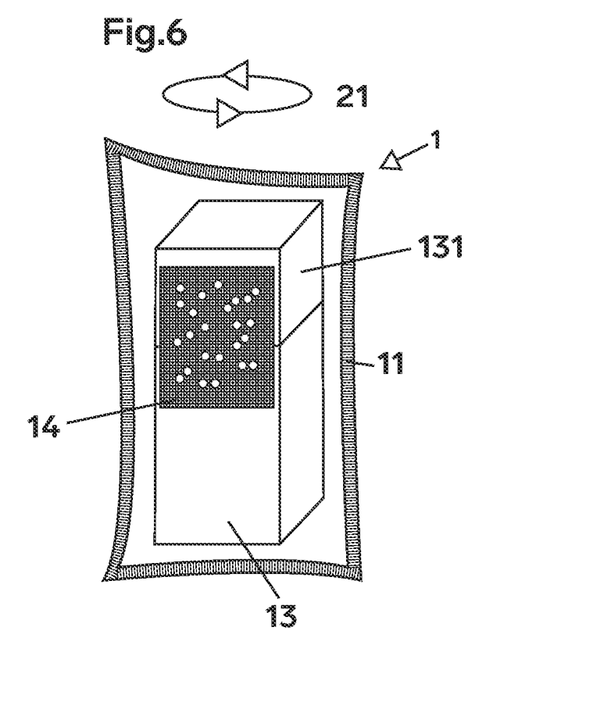
FIG. 6 is a schematic representation of a further embodiment of a safety vacuum packaging according to the invention.

FIG. 6 shows a schematic representation of a further embodiment of a safety vacuum packaging 1 according to the invention. Here, the object 13 to be secured is arranged in the safety vacuum packaging 1, which is preferably designed as a bottle with closure 131 with a twist-off closure 21. The particle container 14 is preferably at least partially attached to the closure 131 with an adhesive.

Figure 7:
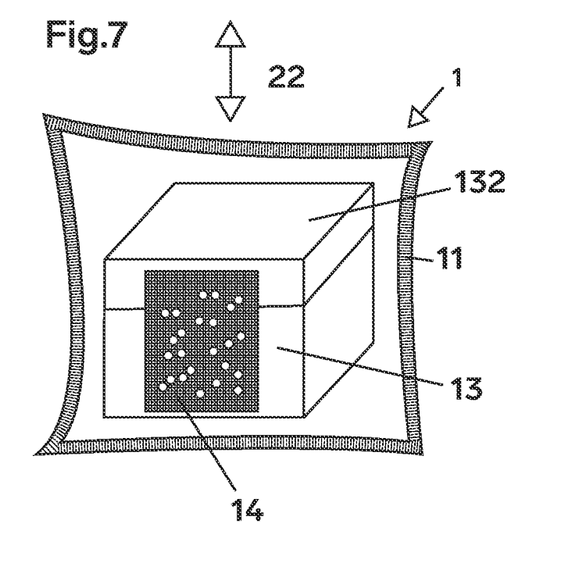
FIG. 7 is a schematic representation of a further embodiment of a safety vacuum packaging according to the invention.

FIG. 7 shows a schematic representation of a further embodiment of a safety vacuum packaging 1 according to the invention. Here, the object 13 to be secured is arranged in the safety vacuum packaging 1, which is preferably designed as a box with a cover 132 with a slip-on closure 22. The particle container 14 is preferably at least partially attached to the cover 132 with an adhesive.

The invention claimed is:

1. A method for closing and securing a safety vacuum packaging the method comprising:
    providing a safety vacuum packaging;
    arranging an object to be secured in an interior space of a container of the safety vacuum packaging;
    arranging a plurality of particles in the interior space of the container;
    vacuuming the safety vacuum packaging via a vacuum seal, the plurality of particles being fixed in a random immobile state;
    closing the safety vacuum packaging;
    capturing the random immobile state of the particles; and
    storing the captured random immobile state of the particles.

2. The method according to claim 1, further comprising re capturing the random immobile state of the particles; and
    comparing and verifying the re-captured random immobile state of the particles with a stored random immobile state of the particles.

3. The method according to claim 1, wherein the particles corresponds to 10 to 1000 particles.

4. The method according to claim 1, wherein the capturing of the random immobile state of the particles includes capturing via an optical method.

5. The method according to claim 1, wherein the capturing of the random immobile state of the particles includes capturing via a spectroscopic method.

6. The method according to claim 1, wherein the storing the random immobile state of the particles includes storing in a database.

7. The method according to claim 1, wherein the capturing of the random immobile state of the particles including capturing photographically by a camera and the storing includes storing in a secure database.

8. The safety vacuum packaging for closing and securing by the method according to claim 1, safety vacuum packaging comprising:
    the container having an interior space for receiving an object to be secured;
    the plurality of unconnected particles arranged in the interior space of the container; and
    the vacuum seal configured to vacuum and seal the interior space of the container.

9. The safety vacuum packaging according to claim 8, further comprising a particle container arranged in the interior space of the container for receiving the particles, the particles at least partially arranged in the particle container.

10. The safety vacuum packaging according to claim 9, wherein the object to be secured has a surface, and the particle container comprises a first attachment device by which the particle container is attached to the surface of the object to be secured.

11. The safety vacuum packaging according to claim 10, wherein the particle container comprises a second attachment device by which the particle container is attached to the container in the interior space.

12. The safety vacuum packaging according to claim 10, wherein the particle container is an air-permeable particle container configured to form an open system with the interior space of the container.

13. The safety vacuum packaging according to claim 9, wherein the particle container has at least a transparent particle container part.

14. The safety vacuum packaging according to claim 9, wherein the particle container includes a thin rigid material.

15. The safety vacuum packaging according to claim 8, wherein the particles are microparticles with a diameter between 0.01 mm and 5 mm.

16. The safety vacuum packaging according to claim 8, wherein the container has at least a transparent container part.

17. The safety vacuum packaging according to claim 8, wherein the particles are spherical particles.

18. The safety vacuum packaging according to claim 8, wherein the particles include white plastic or rubber or sugar or glass or ceramic or polystyrene.

19. A safety vacuum packaging according to claim 8, wherein the container has a completely transparent container side.

20. A computer program product for verifying a random immobile state of the particles captured by a method according to claim 1, by comparing the re-captured random immobile state of the particles with the stored random immobile state of the particles in a safety vacuum packaging.

* * * * *